US007830836B2

(12) United States Patent
Wan

(10) Patent No.: US 7,830,836 B2
(45) Date of Patent: Nov. 9, 2010

(54) METHOD AND SYSTEM FOR IMPROVING QOS OF ACCESS TERMINAL INTERACTIVE DATA

(75) Inventor: Rong Wan, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 342 days.

(21) Appl. No.: 11/877,383

(22) Filed: Oct. 23, 2007

(65) Prior Publication Data

US 2008/0107028 A1 May 8, 2008

Related U.S. Application Data

(63) Continuation of application No. PCT/CN2006/001008, filed on May 17, 2006.

(30) Foreign Application Priority Data

May 19, 2005 (CN) .................. 2005 1 0070970

(51) Int. Cl.
H04W 4/00 (2009.01)
H04L 12/28 (2006.01)
H04B 7/00 (2006.01)
(52) U.S. Cl. .................. 370/329; 370/282; 370/335; 370/342; 370/395.43; 370/469; 455/509; 455/522
(58) Field of Classification Search ......... 370/228–522; 455/22, 69, 509, 522
See application file for complete search history.

(56) References Cited

U.S. PATENT DOCUMENTS

| | | | | |
|---|---|---|---|---|
| 5,923,650 A * | 7/1999 | Chen et al. | ............... | 370/331 |
| 6,980,523 B1 * | 12/2005 | Lipford et al. | ............... | 370/252 |
| 6,999,425 B2 * | 2/2006 | Cheng et al. | ............... | 370/252 |
| 7,050,405 B2 * | 5/2006 | Attar et al. | ............... | 370/282 |
| 7,139,274 B2 * | 11/2006 | Attar et al. | ............... | 370/395.4 |
| 7,336,632 B2 * | 2/2008 | Cheng et al. | ............... | 370/329 |
| 7,339,894 B2 * | 3/2008 | Corazza | ............... | 370/236 |
| 7,411,974 B2 * | 8/2008 | Attar et al. | ............... | 370/465 |
| 7,565,152 B2 * | 7/2009 | Gandhi et al. | ............... | 455/453 |
| 2003/0223454 A1 * | 12/2003 | Abraham et al. | ............... | 370/465 |
| 2004/0179469 A1 * | 9/2004 | Attar et al. | ............... | 370/208 |
| 2004/0228286 A1 * | 11/2004 | Kim et al. | ............... | 370/252 |
| 2004/0228287 A1 * | 11/2004 | Seol et al. | ............... | 370/252 |

(Continued)

FOREIGN PATENT DOCUMENTS

CN 1484458 A 3/2004

(Continued)

*Primary Examiner*—Ayaz R Sheikh
*Assistant Examiner*—Venkatesh Haliyur
(74) *Attorney, Agent, or Firm*—Finnegan, Henderson, Farabow, Garrett, Dunner LLP

(57) ABSTRACT

A method and a system for improving the QoS of AT interactive data, including: by setting corresponding reverse interuser QoS attribute parameters of reverse transition probability matrix and/or maximum rate limit etc. for ATs of different QoS levels, the transmission rate of the ATs are adjusted, thereby the ATs of different QoS levels are allowed to enjoy different reverse highest rates and reverse average rates, and the QoS of the AT interactive reserve data is improved. This invention can not only meet the demands of different terminal ATs, but also provide a QoS solution of leveled charging service for network operators, satisfying different AT demands and improving operating income at the same time.

13 Claims, 4 Drawing Sheets

U.S. PATENT DOCUMENTS

| | | |
|---|---|---|
| 2005/0124372 A1* | 6/2005 | Lundby et al. .............. 455/522 |
| 2006/0040674 A1* | 2/2006 | Vannithamby et al. ... 455/452.2 |
| 2006/0133268 A1* | 6/2006 | Wu et al. .................... 370/229 |
| 2007/0066340 A1* | 3/2007 | Yoon et al. ................. 455/522 |
| 2007/0097961 A1* | 5/2007 | Sun et al. .................... 370/352 |

FOREIGN PATENT DOCUMENTS

| | | |
|---|---|---|
| KR | 2002011556 | 2/2002 |
| WO | 2004064426 A1 | 7/2004 |
| WO | 2004114716 | 12/2004 |
| WO | 2005020475 A1 | 3/2005 |
| WO | 2005020597 | 3/2005 |
| WO | WO 2006122500 A1 * | 11/2006 |

\* cited by examiner

METHOD AND SYSTEM FOR IMPROVING QOS OF ACCESS TERMINAL INTERACTIVE DATA

The present application is a continuation of PCT application PCT/CN2006/001008, filed on May 17, 2006, entitled "A METHOD FOR IMPROVING USER-INTERACTIVE DATA QOS AND SYSTEM THEREOF", which is incorporated by reference herein in its entirety and claims priority to Chinese Patent Application CN 200510070970.X, filed May 19, 2005.

FIELD OF THE INVENTION

The present invention relates to the field of communication, and particularly to a method and a system for improving QoS of AT (access terminal) interactive data.

BACKGROUND OF THE INVENTION

At present, many communication systems support high-speed transmission of wireless data services, such as CDMA (Code Division Multiple Access) 2000 1xEV-DO (Evolution Data Only) system. During high-speed transmission of a data service, for a single AT, the maximum rate of forward transmission that can be reached is 2.4 Mbps, and the maximum rate of reverse transmission that can be reached by an AT is 153.6 kbps. However, the CDMA2000 system is a self-interference system with limited capacity. When the forward transmission is performed, multiple ATs using the same sector carrier share and compete for the forward bandwidth of 2.4 Mbps. When the reverse transmission is performed, because the total bandwidth of a sector carrier is only 400 k, if the number of ATs is large, the reverse load will rise, which leads to competition between the ATs and power increasing. Hence, both the total throughput of the sector and the throughput of each AT will be reduced, and the Quality of Service (QoS) for the ATs cannot be ensured.

From the purpose of the ATs employing wireless data service transmission, the demands of the ATs are hierarchical. The demands of some ATs are not very high. For example, chatting on QQ demands a very low rate, sending e-mails demands a higher rate than the rate of QQ but does not necessarily has demand on real-time and real-time wireless video service, demands a very high rate. Therefore, and operator needs to have the ability to provide hierarchical inter-user QoS service to meet the various AT demands. While satisfying the demands of ATs, the operator can also improves operating outcome by charging according to levels, for example, the highest rate is provided for a VIP; a middle rate is provided for a high-level AT; and a basic rate is provided for a common AT.

The prior art provides a technical solution for implementing forward inter-user QoS as follows.

The forward channel of CDMA2000 1x EV-DO is a time-division system, in which an Access Network (AN) provides a real-time scheduling module for deciding when and for how long each AT will obtain the service according to some factors such as requested rate, historical throughput and AT function. Shares of the service obtained by different ATs can be adjusted in real time by means of the AT function. The higher the level of the AT is, the larger the share is, the more the chances to be scheduled can be obtained, and the higher the rate is.

In the prior art, only forward inter-user QoS can be realized. The priority or level of an AT can not be considered in the reverse direction, e.g., corresponding reverse highest rates and reverse average rates cannot be provided for ATs of different levels. So, in the reverse direction, when the ATs are not many and the system capacity has not been saturated, the service demand of each AT can be satisfied; once the reverse load is relatively high, competition will occur among the ATs, leading to a widely decreasing of the reverse rate of each AT. The ATs closer to the base station are more competitive than that far away from the base station, but the high-speed service demands of some ATs cannot be satisfied.

SUMMARY OF THE INVENTION

The present invention provides a method and a system for improving the QoS of AT interactive data, which is able to provide corresponding reverse highest rates and reverse average rates for ATs of different QoS levels.

The present invention provides a method for improving the QoS of AT interactive data including:

A. setting attribute parameters of a reverse inter-user QoS level for an AT according to the QoS level of the AT;

B. adjusting the transmission rate of the AT based on the attribute parameters of the reverse inter-user QoS level.

In an embodiment of the present invention, the step A includes:

A1. setting an attribute parameter of maximum rate limit for the AT and setting a corresponding attribute parameter of reverse transition probability matrix for the AT according to the QoS level of the AT;

or,

A2. setting an attribute parameter of reverse transition probability matrix for the AT, and setting a corresponding attribute parameter of reverse maximum rate limit for the AT according to the QoS level of the AT and the current reverse load level;

or,

A3. setting a corresponding attribute parameter of reverse transition probability matrix for the AT according to the QoS level of the AT, and setting a corresponding attribute parameter of reverse maximum rate limit for the AT according to the QoS level of the AT and the current reverse load level;

or,

A4. setting an attribute parameter of reverse transition probability matrix for the AT, and setting an attribute parameter of corresponding reverse maximum rate limit for the AT according to the QoS level of the AT.

In an embodiment of the present invention, the process of setting a corresponding attribute parameter of reverse transition probability matrix for the AT according to the QoS level of the AT includes:

setting, by an Access Network, a high attribute parameter of transition probability matrix for an AT of high QoS level, and setting a low attribute parameter of transition probability matrix for an AT of low QoS level.

In an embodiment of the present invention, the process of setting an attribute parameter of reverse maximum rate limit corresponding to the AT's QoS level for the AT includes:

setting a high attribute parameter of reverse maximum rate limit for an AT of high QoS level, and setting a low attribute parameter of reverse maximum rate limit for an AT of low QoS level.

In an embodiment of the present invention the process of setting a corresponding attribute parameter of reverse maximum rate limit for the AT's according to the QoS level of the AT and the current reverse load level includes:

determining the reverse load level of the system according to the total noise received on the reverse direction;

according to the load level and the QoS level of the AT, setting a high attribute parameter of reverse maximum rate limit for an AT of high QoS level, and setting a low attribute parameter of reverse maximum rate limit for an AT of low QoS level.

In an embodiment of the present invention, the step B includes:

B1. obtaining, by the Access Network, the attribute parameter of reverse inter-user QoS level corresponding to the QoS level subscribed by the AT;

B2. adjusting the transmission rate of an AT of each QoS level based on the attribute parameter.

In an embodiment of the present invention, the step B1 includes:

B11. accessing, by the AT, the system by a connection request message in which the indentity information of the AT is carried;

B12. querying, by the Access Network, the QoS level subscribed by the AT in account information of the AT according to the identity information, and obtaining the corresponding attribute parameters of reverse transition probability matrix and/or maximum rate limit according to the QoS level.

In an embodiment of the present invention, the step B2 includes:

B21. notifying, by the Access Network, the AT to update the transition probability matrix by negotiating an attribute parameter of rate, and updating the reverse maximum rate limit of the AT using the attribute parameter of maximum rate limit set for the AT by transmitting a reverse rate limit message;

B22. determining whether the load on the reverse traffic channel is overloaded according to the total noise received on the reverse direction, if Yes, transmitting a Reverse Activity Bit characterized as overloaded to the AT, and then performing step B23; otherwise, transmitting a Reverse Activity Bit characterized as not overloaded to the AT, and then performing step B23;

B23. receiving, by the AT, the Reverse Activity Bit, and adjusting the transmission rate of the reverse channel according to the characteristic of the Reverse Activity Bit and updated attribute parameters of transition probability matrix and/or maximum rate limit.

In an embodiment of the present invention, the step B23 includes:

B231. receiving, by the AT, the Reverse Activity Bit, and determining whether the reverse load is overloaded according to the characteristic of the Reverse Activity Bit, if Yes, step B232 is performed; otherwise, step B233 is performed;

B232. reducing the reverse transmission rate according to the updated attribute parameters of reverse maximum rate limit and/or transition probability matrix;

B233. improving the reverse transmission rate according to the updated attribute parameters of reverse maximum rate limit and/or transition probability matrix.

In an embodiment of the present invention, the step B232 includes:

B2321. selecting, by the AT, an attribute parameter of transition probability according to current transmission rate of the AT;

B2322. comparing, by the Access Terminal, a random number it generated with the selected attribute parameter of transition probability, if the random number is less than transition probability, then reducing its current rate to the transmission rate of the next lower grade described in the attribute parameter of transition probability matrix; otherwise, keeping the original rate;

or,

B2323. reducing, by the AT, the reverse transmission rate within the range permitted by the updated maximum rate limit according to the updated attribute parameter of reverse transition probability matrix.

In an embodiment of the present invention, the step B233 includes:

B2331. selecting, by the AT, an attribute parameter of transition probability for its Access Terminal according to its current transmission rate;

B2332. comparing, by the AT, a random number it generated with the selected transition probability, if the random number is less than the transition probability, then improving its current rate to the transmission rate of the next upper grade described in the attribute parameter of transition probability matrix within the range permitted by the maximum rate limit; otherwise, keeping the original rate;

or,

B2333. improving, by the AT, the reverse transmission rate within the range permitted by the updated maximum rate limit according to the updated attribute parameter of reverse transition probability matrix.

In another aspect of the present invention, the present invention also provides a method for improving the QoS of AT interactive data, including:

1) obtaining, by an AT, an attribute parameter of reverse inter-user QoS level corresponding to the QoS level subscribed by the AT from the Access Network when the AT accesses the system by a connection request message;

2) based on the information regarding whether the reverse load is overloaded, the user terminal adjusting the reverse transmission rate according to the attribute parameter of reverse inter-user QoS level.

The step 1) includes:

11) accessing, by the AT, the system by the connection request message in which the identity information of the AT is carried;

12) querying, by the Access Network, the QoS level subscribed by the AT in account information of the AT according to the identity information, and obtaining the corresponding attribute parameters of reverse transition probability matrix and/or maximum rate limit according to the QoS level;

13) notifying, by the Access Network, the AT to update the transition probability matrix by negotiating the attribute parameter of rate, and updating the reverse maximum rate limit of the AT using the attribute parameter of maximum rate limit set for the AT by transmitting a reverse rate limit message.

The step 2) includes:

21) determining, by the Access Network, whether the load on the reverse traffic channel is overloaded according to the total noise received on the reverse direction, if Yes, transmitting a Reverse Activity Bit characterized as overloaded to the AT, and then performing step 22); otherwise, transmitting a Reverse Activity Bit characterized as not overloaded to the AT, and then performing step 22);

22) receiving, by the AT, the Reverse Activity Bit, and adjusting the reverse transmission rate according to the characteristic of the Reverse Activity Bit and the updated attribute parameters of transition probability matrix and/or maximum rate limit.

In another aspect of the present invention, the present invention also provides a system for improving the QoS of AT interactive data, including an AT and an Access Network; in which, attribute parameters of reverse inter-user QoS level corresponding to the QoS level subscribed by the AT is configured in the Access Network;

when accessing the system by a connection request message, the user terminal obtains the attribute parameters of reverse inter-user QoS level corresponding to the QoS level subscribed by the AT from the Access Network; based on the information regarding whether the reverse load is overloaded obtained from the Access Network, adjusts the transmission rate of the reverse channel according to the attribute parameters of reverse inter-user QoS level.

It can be seen from the technical solution of the present invention that the reverse transmission rate of the AT is adjusted based on the attribute parameters of reverse inter-user QoS set for ATs of different QoS levels, so that the ATs of different levels enjoy different reverse highest rates and reverse average rates. Therefore, the QoS of the AT interactive data is improved, and the problem that corresponding reverse highest rates and reverse average rates for the ATs of different QoS levels cannot be provided the prior art is solved. The present invention can not only meet the demands of different terminal users, but also provide a QoS solution of hierarchical charging service for network operators, satisfying different AT demands and improving operating income at the same time.

DETAILED DESCRIPTION OF THE EMBODIMENTS

The present invention provides a method for improving the QoS of the AT interactive data, including adjusting the transmission rate of the ATs by setting corresponding reverse attribute parameters of inter-user QoS such as reverse transition probability matrix and/or maximum rate limit etc. for ATs of different QoS levels, thereby the object of improving the QoS of the AT reverse data is achieved.

QoS levels of ATs are generally partitioned by operators according to the demands of their service operating. For example, the ATs can be divided into three classes according to the QoS levels: VIP ATs, high-priority ATs and common ATs. Of course the classification is not limited to this. An AT registers the QoS level he/she demands when the account of the AT is established.

Figure 1:
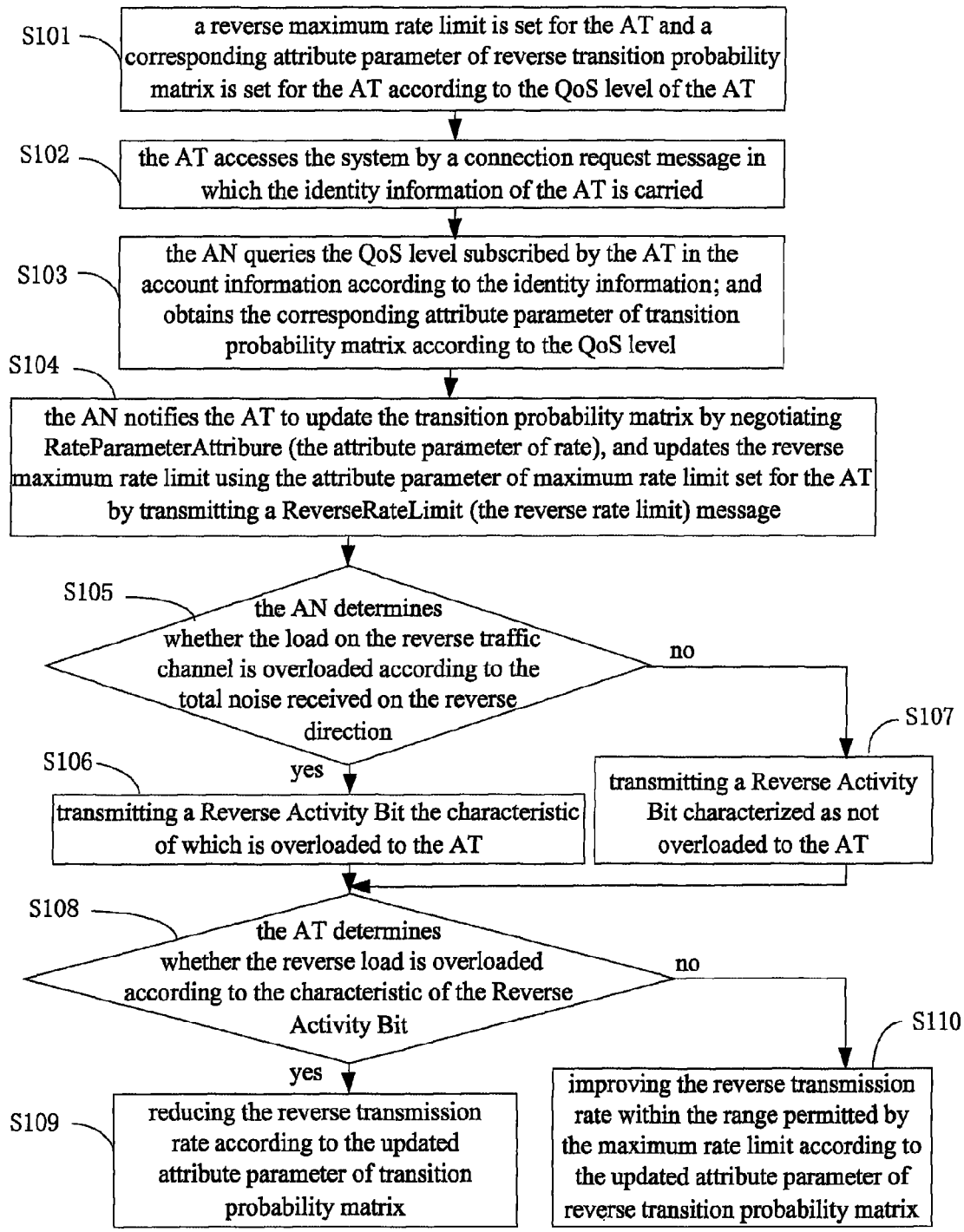
FIG. 1 is a flow diagram illustrating a first embodiment of the present invention.

Take the above-mentioned classification result for example, as shown in FIG. 1, a first embodiment provided by the present invention includes:

Block S101, a reverse maximum rate limit is set for the AT and a corresponding attribute parameter of reverse transition probability matrix is set for the AT according to the QoS level of the AT.

For the reverse transmission rate, possible rate levels are 9.6 kbps, 19.2 kbps, 38.4 kbps, 76.8 kbps and 153.6 kbps.

Considering the possible rate levels, when the corresponding attribute parameter of maximum rate limit is set for the AT, it can be set either to all the ATs in a system uniformly or to each AT in the system respectively.

Considering the possible rate levels, when setting the corresponding attribute parameter of reverse transition probability matrix for the AT, possible transition probabilities are shown in Table 1.

TABLE 1

| |
| --- |
| Transition009k6__019k2 |
| Transition019k2__038k4 |
| Transition038k4__076k8 |
| Transition076k8__153k6 |
| Transition019k2__009k6 |
| Transition038k4__019k2 |
| Transition076k8__038k4 |
| Transition153k6__076k8 |

Each attribute parameter in Table 1 is larger than 0 and less than 1, and from the representation of each attribute parameter it can be seen that two rate levels are identified in each attribute parameter. For example, 0<Transition038k4__019k2<1, the two rate levels identified in this attribute parameter are respectively 19.2 kbps and 38.4 kbps. The transition probability matrix may configured for each AT (Access Terminal).

For example, when dividing the ATs into VIP ATs, high-priority ATs and common ATs according to the above-mentioned QoS levels of the ATs, the attribute parameters of transition probability matrix set for respective levels are shown in Table 2:

TABLE 2

| | VIP ATs | high-priority ATs | Common ATs |
| --- | --- | --- | --- |
| Transition009k6__019k2 | Y11 | Y12 | Y13 |
| Transition019k2__038k4 | Y21 | Y22 | Y33 |
| Transition038k4__076k8 | Y31 | Y32 | Y33 |
| Transition076k8__153k6 | Y41 | Y42 | Y43 |
| Transition019k2__009k6 | Y51 | Y52 | Y53 |
| Transition038k4__019k2 | Y61 | Y62 | Y63 |
| Transition076k8__038k4 | Y71 | Y72 | Y73 |
| Transition153k6__076k8 | Y81 | Y82 | Y83 |

All the data in this table satisfy:

$$Y_{i1} \geq Y_{i2} \geq Y_{i3}, Y_{ij} \in [0,1], j=1,2,3; i=1\sim4 \qquad 1.$$

$$Y_{i1} \leq Y_{i2} \leq Y_{i3}, Y_{ij} \in [0,1], j=1,2,3; i=5\sim8 \qquad 2.$$

From the above-mentioned setting, it can be seen that according to the QoS levels of the ATs, the AN sets a high attribute parameter of transition probability matrix for an AT of high QoS level, and sets a low attribute parameter of transition probability matrix for an AT of low QoS level.

In block S102 of FIG. 1, the AT accesses the system by a connection request message which carries the identity information of the AT.

In block S103, the AN queries the QoS level subscribed by the AT in account information of the AT according to the identity information; and obtains the corresponding attribute parameter of transition probability matrix according to the QoS level.

After the above process, the AN is able to adjust the transmission rate of the AT of each QoS level based on the attribute parameter, thereby the QoS of the AT interactive reverse data is improved.

Block S104, the AN notifies the AT to update the transition probability matrix by negotiating the attribute parameter of rate, such as RateParameterAttribute, and updates the reverse maximum rate limit using the attribute parameter of maximum rate limit set for the AT by transmitting a the reverse rate limit message, such as ReverseRateLimit.

Block S105, the AN determines whether the load on the reverse traffic channel is overloaded according to the total noise received on the reverse channel, if Yes, block S106 is performed, the AN transmits an indication, such as Reverse Activity Bit, characterized as overloaded to the Access Terminal of the user, and then block S108 is performed; otherwise, block S107 is performed, the AN transmits the Reverse Activity Bit characterized as not overloaded to the AT, and then block S108 is performed.

During block S105, on determining whether the reverse traffic channel is overloaded according to the total noise received on the reverse direction, the AN transmits the information regarding whether the reverse traffic channel is overloaded to the AT by transmitting an indication, such as Reverse Activity Bit RA, where 'RA=1' represents overloaded and 'RA=0' represents not overloaded.

The RA bit transmitted by the AN is identical to all the ATs in one sector carrier.

Block S108, the AT receives the Reverse Activity Bit, and determines whether the reverse traffic channel is overloaded according to the characteristic of the Reverse Activity Bit, if Yes, block S109 is performed; otherwise, block S110 is performed.

The AT demodulates the RA, if the load is overloaded, it indicates that the rate should be reduced by a certain probability; if the load is not overloaded, it indicates that the rate should be increased by a certain probability. The RA bit is identical for all the ATs in one system, but not all of the ATs increase the rates or reduce the rates simultaneously after the AT receive the RA bit, while each AT determines whether to increase the rate or reduce the rate finally according to the transition probability matrix.

Block S109, reducing the reverse transmission rate according to the updated attribute parameter of transition probability matrix. The specific implementation process may be:

Firstly, the AT selects an attribute parameter of transition probability according to the current transmission rate.

Then, the AT compares a random number it generated with the selected attribute parameter of transition probability, if the random number is less than the transition probability, the AT reduces the current rate to the transmission rate of the next lower grade described in the attribute parameter of transition probability matrix; otherwise, keeps the original rate.

Block S110, improving the reverse transmission rate within the range permitted by the maximum rate limit according to the updated attribute parameter of reverse transition probability matrix. The specific implementation process may be:

At first, the AT selects an attribute parameter of transition probability according to the current transmission rate;

Then the AT compares a random number it generated with the selected attribute parameter of transition probability, if the random number is less than the transition probability, the AT increases its current rate to the transmission rate of the next higher grade described in the attribute parameter of transition probability matrix within the range permitted by the maximum rate limit; otherwise, keeps the original rate.

Now blocks S109 and S110 will be described in detail still taking the attribute parameters in Table 1 for example:

Assuming the current rate of the AT is 38.4 kbps, the attribute parameter of transition probability is selected as Transition038k4_019k2.

When the AT demodulates the RA bit and finds that the bit indicates reducing the rate, the AT will generate a random number x, and $0<x<1$; when x<Transition038k4_019k2, the rate of the AT is reduced from 38.4 kbps to 19.2 bps, otherwise, the original rate is kept.

When the AT demodulates the RA bit and finds that it indicates increasing the rate, the AT will generate a random number x, and $0<x<1$; when x<Transition038k4_076k8, the rate of the AT is improved from 38.4 kbps to 76.8 kbps within the range permitted by the maximum rate limit, otherwise, the original rate is kept.

Figure 2:
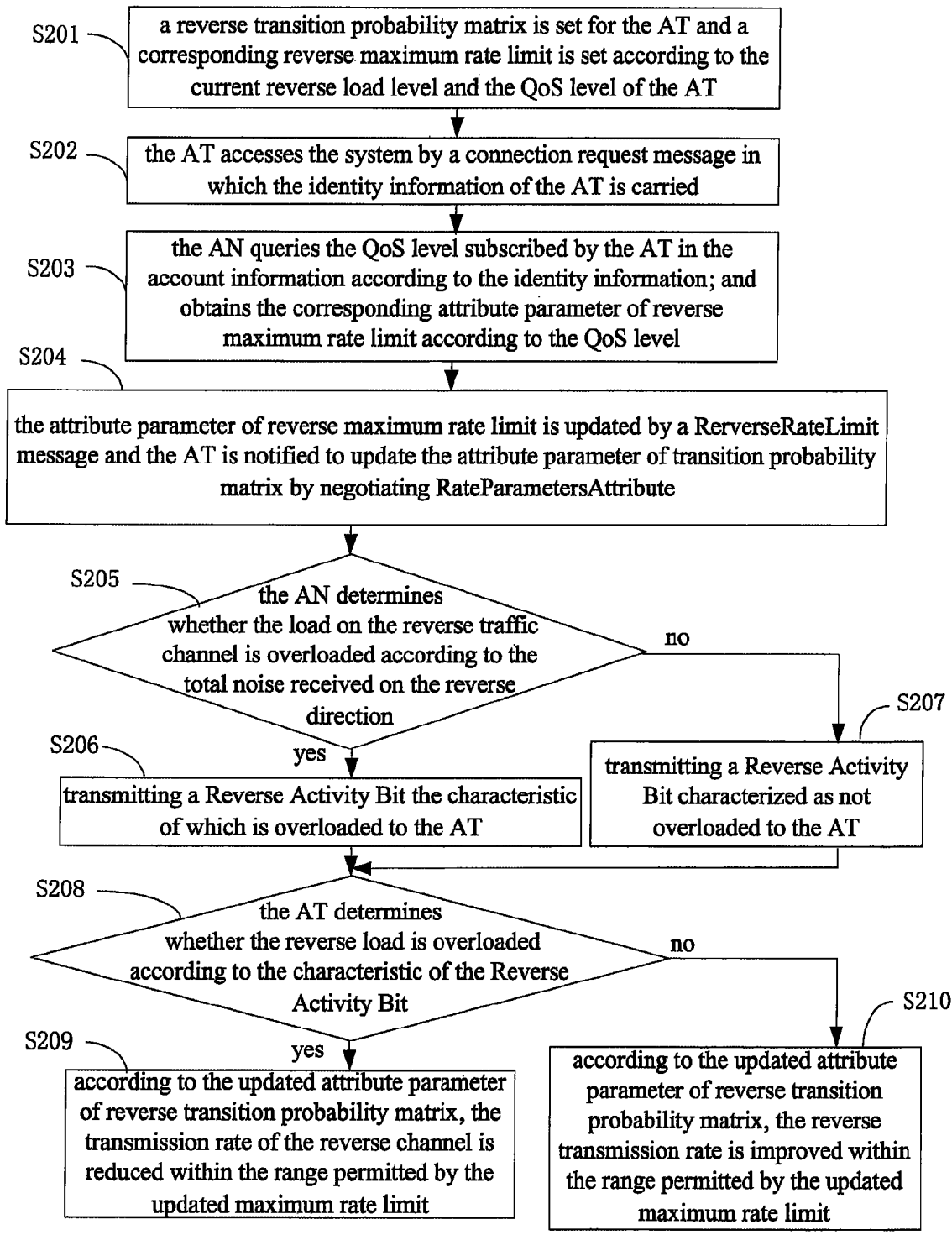
FIG. 2 is a flow diagram illustrating a second embodiment of the present invention.

As shown in FIG. 2, an embodiment provided by the present invention includes:

Block S201, a reverse transition probability matrix is set for the AT and a corresponding reverse maximum rate limit is set according to the current reverse load level and the QoS level of the AT.

The maximum reverse rate of the AT may not exceed the maximum rate limit (Ratelimit). According to possible rate grades of the reverse transmission rate: 9.6 kbps, 19.2 kbps, 38.4 kbps, 78.6 kbps and 153.6 kbps, the Ratelimit of the AT is divided into five grades: 9.6 kbps, 19.2 kbps, 38.4 kbps, 78.6 kbps and 153.6 kbps.

The AN sets a corresponding attribute parameter of transition probability matrix for each AT according to the above-mentioned possible rate grades of the reverse transmission rate.

The process of the AN setting the corresponding maximum rate limit according to the QoS level of the AT and the current reverse load level is:

Step 1, according to the QoS level of the AT, the AN sets a high current reverse maximum rate limit for an AT of a high QoS level, and sets a low current reverse maximum rate limit for an AT of a low QoS level;

Step 2, the AN determines the reverse load level of the system according to the total noise received on the reverse direction, and based on the load level, sets the corresponding reverse maximum rate limit according to the QoS level of the AT.

The AN determines the reverse load level according to the total noise received on the reverse direction. Here assuming the reverse load is divided into 3 grades, e.g. high-load status, middle-load status and low-load status. Two thresholds, NoiseThresh1 and NoiseThresh2 are set.

If the total reverse noise<NoiseThresh1, the AN considers that the system is in the low-load status; where the AN sets the maximum rate limit of each AT according to the bandwidth of the system: sets a high reverse maximum rate limit for the an AT of a high QoS level, and sets a low reverse maximum rate limit for an AT of a low QoS level;

if NoiseThresh1<=the total reverse noise<NoiseThresh2, the AN considers that the system is in the middle-load status; where the AN keeps the current maximum rate limit set for the AT of the high QoS level and keeps the current maximum rate limits set for the AT of the low QoS level;

if NoiseThresh2<=the total reverse noise, the AN considers that the system is in the high-load status; where the AN sets a reverse maximum rate limit lower than the current maximum rate limit by one grade for the AT of the high QoS level, and sets a reverse maximum rate limit lower than the current maximum rate limit by one grade for the AT of the low QoS level.

Still take example for dividing the ATs into VIP ATs, high-priority ATs and common ATs according to the QoS levels of the ATs as mentioned above, the result of setting the Ratelimit for the ATs of each level by the AN are shown in Table 3:

TABLE 3

|  | VIP ATs | High-priority ATs | Common Ats |
|---|---|---|---|
| Reverse low-load status | X11 | X12 | X13 |
| Reverse middle-load status | X21 | X22 | X23 |
| Reverse high-load status | X31 | X32 | X33 | where all the data in this table satisfy the following demands:

$$X_{ij} \in [9.6 \text{ kbps}, 153.6 \text{ kbps}], i/j=1,2,3 \qquad 1.$$

$$X_{i1} \geq X_{i2} \geq X_{i3}, X_{ij} \in [9.6 \text{ kbps}, 153.6 \text{ kbps}], i/j=1,2,3, \text{ and} \qquad 2.$$

$$X_{1j} \geq X_{2j} \geq X_{3j}, i/j=1,2,3 \qquad 3.$$

Block S202, the AT accesses the system by a connection request message in which the identity information of the AT is carried.

Block S203, the AN queries the QoS level subscribed by the AT in account information of the AT according to the identity information; and obtains the corresponding attribute parameter of reverse maximum rate limit according to the QoS level.

Block 204, updating the reverse maximum rate limit of the AT by transmitting a ReverseRateLimit (reverse rate limit) message; the AT is notified to update the current attribute parameter of reverse transition probability matrix using the attribute parameter of reverse transition probability matrix set for the AT by negotiating RateParameterAttribute.

Block S205, the Access Network determines whether the reverse traffic channel is overloaded according to the total noise received on the reverse direction, if Yes, block S206 is performed, a Reverse Activity Bit characterized as overloaded is transmitted to the Access Terminal, and then block S208 is performed; otherwise, block S207 is performed, a Reverse Activity Bit characterized as not overloaded is transmitted to the AT, and then block S208 is performed.

Block S208, the AT receives the Reverse Activity Bit, and determines whether the reverse traffic channel is overloaded according to the characteristic of the Reverse Activity Bit, if Yes, block S209 is performed; otherwise, block S210 is performed.

Block S209, according to the updated attribute parameter of reverse transition probability matrix, the transmission rate of the reverse channel is reduced within the range permitted by the updated maximum rate limit.

Block S210, according to the updated attribute parameter of reverse transition probability matrix, the transmission rate of the reverse channel is increased within the range permitted by the updated maximum rate limit.

Figure 3:
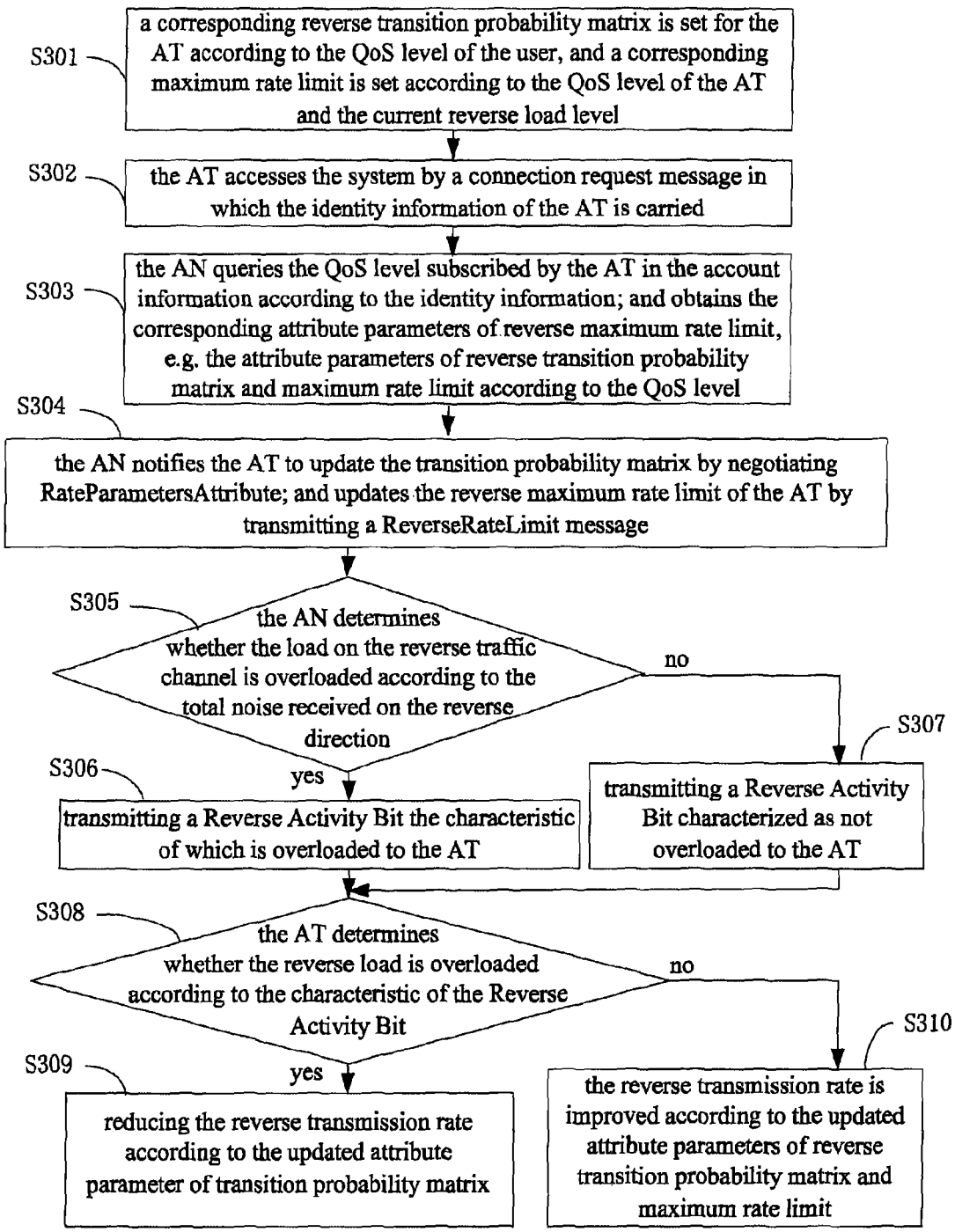
FIG. 3 is a flow diagram illustrating a third embodiment of the present invention.

As shown in FIG. 3, the third embodiment provided by the present invention includes:

Block S301, a corresponding reverse transition probability matrix is set for the AT according to the QoS level of the AT, and a corresponding maximum rate limit is set according to the QoS level of the AT and the current reverse load level.

Referring to the detailed description of blocks S101 and S102 in an embodiment for the specific implementation process.

Block S302, the AT accesses the system by a connection request message, in which the identity information of the AT is carried.

Block S303, the AN queries the QoS level subscribed by the AT in account information of the AT according to the identity information; and obtains the corresponding attribute parameters of reverse maximum rate limit, e.g. the attribute parameters of reverse transition probability matrix and maximum rate limit according to the QoS level.

After the above-mentioned steps, the AN is able to adjust the transmission rates of ATs of each QoS levels based on the attribute parameters, thereby the QoS of the AT interactive reverse data is improved.

Block S304, the AN notifies the AT to update the transition probability matrix by negotiating RateParametersAttribute; and updates the reverse maximum rate limit of the AT by transmitting a ReverseRateLimit message.

Block S305, the AN determines whether the reverse traffic channel is overloaded according to the total noise received on the reverse direction, if Yes, block S306, the AN transmits a Reverse Activity Bit characterized as overloaded to the Access Terminal, and then block S308 is performed; otherwise, block S307, the AN transmits a Reverse Activity Bit characterized as not overloaded to the AT, and then block S308 is performed.

Block S308, the AT receives the Reverse Activity Bit, and determines whether the reverse load is overloaded according to the characteristic of the Reverse Activity Bit, if Yes, ion block S109 is performed; otherwise, block S110 is performed.

Block S309, the reverse transmission rate is reduced according to the updated attribute parameter of reverse transition probability matrix. The specific implementation process is:

Firstly, the AT selects an attribute parameter of transition probability according to the current transmission rate.

Then, the AT compares a random number it generated with the selected attribute parameter of transition probability, if the random number is less than the transition probability, the AT reduces its current rate to the transmission rate of the next lower grade described in the attribute parameter of transition probability matrix; otherwise, keeps the original rate.

Block S310, the reverse transmission rate is increased according to the updated attribute parameters of reverse transition probability matrix and maximum rate limit. The specific implementation process is:

At first, the AT selects an attribute parameter of transition probability according to the current transmission rate;

then the AT compares a random number it generated with the selected attribute parameter of transition probability, if the random number is less than the transition probability, the AT increases its current rate to the transmission rate of the next higher grade described in the attribute parameter of transition probability matrix within the range permitted by the maximum rate limit; otherwise, keeps the original rate.

Assuming the current rate of the AT is 38.4 kbps, the attribute parameter of transition probability matrix is selected as Transition038k4_019k2.

When the AT demodulates the RA bit and find it indicates reducing the rate, the AT will generate a random number x, and 0<x<1; when x<Transition038k4_019k2, the rate of the AT is reduced from 38.4 kbps to 19.2 bps, otherwise, the original rate is kept.

When the AT demodulates the RA bit and find that it indicates improving the rate, the AT will generate a random number x, and 0<x<1; when x<Transition038k4_076k8, the rate of the AT is improved from 38.4 kbps to 76.8 kbps within the range permitted by the maximum rate limit, otherwise, the original rate is kept.

Figure 4:
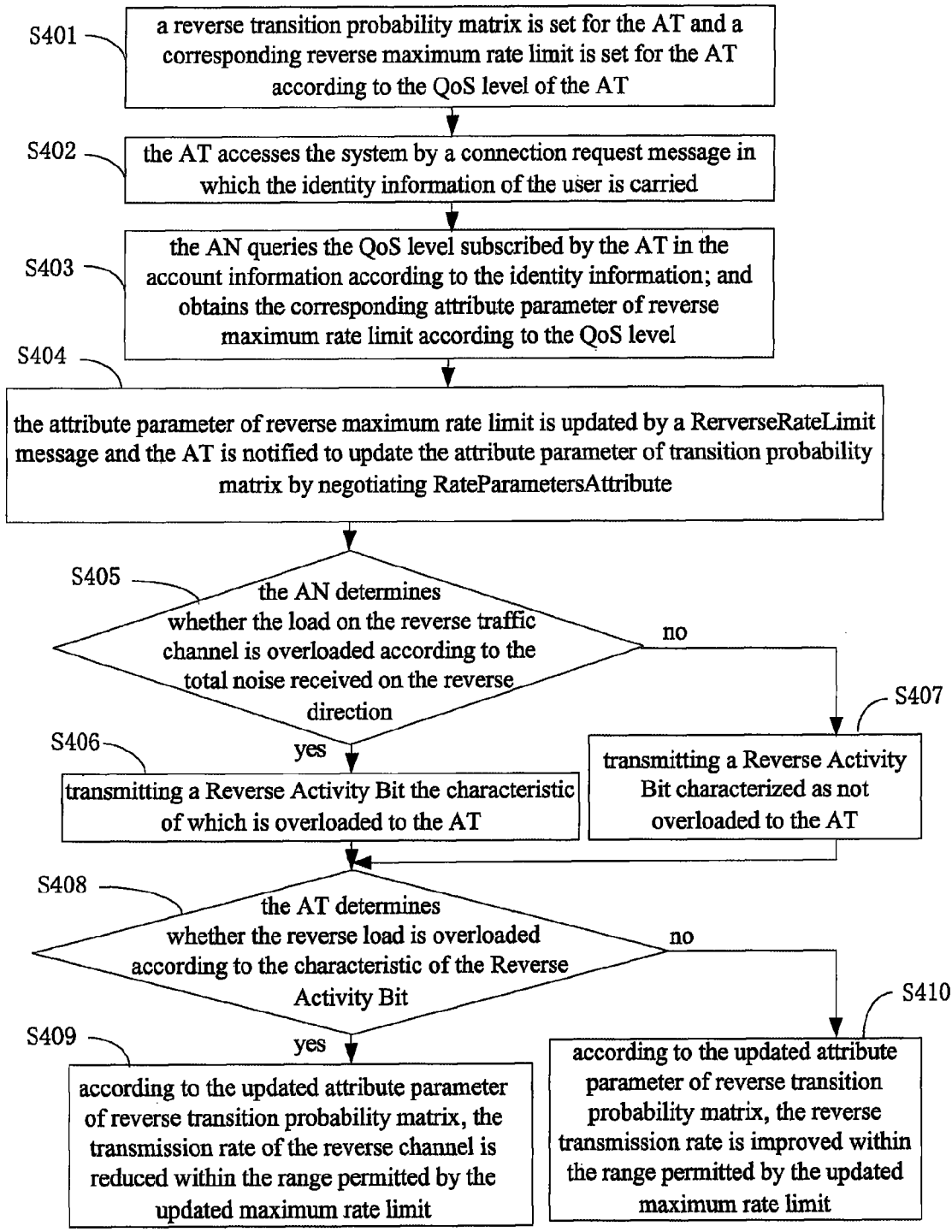
FIG. 4 is a flow diagram illustrating a fourth embodiment of the present invention.

As shown in FIG. 4, the fourth embodiment provided by the present invention includes:

Block S401, a reverse transition probability matrix is set for the AT and a corresponding reverse maximum rate limit is set for the AT according to the QoS level of the AT.

Take example for dividing the ATs into VIP ATs, high-priority ATs and common ATs according to the QoS levels of the ATs as mentioned above, the attribute parameters of reverse maximum rate limit set for each AT are shown in Table 4:

TABLE 4

|  | VIP ATs | High-priority ATs | Common ATs |
|---|---|---|---|
| Reverse maximum rate limit | X1 | X2 | X3 |

Block S402, the AT accesses the system by a connection message, in which the identity information of the AT is carried.

Block S403, the AN queries the QoS level subscribed by the AT in the account information according to identity information of the AT; and obtains the corresponding attribute parameter of reverse maximum rate limit according to the QoS level.

After the above-mentioned steps, the AN is able to adjust the transmission rates of the ATs of different QoS levels based on the attribute parameters, thereby the QoS of the AT interactive reverse data is improved. The specific implementation process is:

Block S404, the attribute parameter of reverse maximum rate limit is updated by a RerverseRateLimit message and the AT is notified to update the attribute parameter of transition probability matrix by negotiating RateParametersAttribute.

Block S405, the AN determines whether the reverse traffic channel is overloaded according to the total noise received on the reverse direction, if Yes, block S406 is performed, a Reverse Activity Bit characterized as overloaded is transmitted to the Access Terminal and then block S408 is performed; otherwise, block S407, a Reverse Activity Bit characterized as not overloaded is transmitted to the AT, and then block S408 is performed.

Block S408, the AT receives the Reverse Activity Bit, and determines whether the reverse traffic channel is overloaded according to the characteristic of the Reverse Activity Bit, if Yes, block S409 is performed; otherwise, block S410 is performed.

Block S409, according to the updated attribute parameter of reverse transition probability matrix, the reverse transmission rate channel is reduced within the range permitted by the maximum rate limit.

Block S410, according to the updated attribute parameter of reverse transition probability matrix, the reverse transmission rate is increased within the range permitted by the maximum rate limit.

By the implementation steps in the above-mentioned embodiments, for the ATs with activity connection using the same sector carrier:

the average rate of the VIP AT service≧the average rate of the high-priority AT service≧the average rate of the common AT service According to the present invention, if the QoS strategy of an operator is changed, the values of the "reverse inter-user QoS" attribute parameters can also be modified dynamically according to the demand, and the attribute parameters of maximum rate limit and transition probability matrix of the ATs demanding different service levels can also be adjusted.

For example, when the operator wish to increase the QoS disparity between the ATs of different levels, the difference between the parameters of the ATs with different levels in Tables 1, 2 and 3 can be made bigger; on the contrary, the difference between the parameters can be made less.

It can be seen from the embodiments of the present invention, the invention is able to provide reverse inter-user QoS service for CDMA2000 1XEV-DO system, making the ATs with different levels enjoy different reverse highest rates and reverse average rates; in each reverse load statuses, different highest rates are set to facilitate the stability of the system; the present invention can satisfy demands of different ATs, the ATs with only low-rate demand may pay less fee and save the spending, while the ATs with high-rate demands may purchase high-rate services. Therefore, not only the satisfaction degree of the terminal users is improved, but also the service categories of the operator is enriched, by which the ATs are attracted by the operator and the operating income is obtained.

It should be emphasized that the above-described embodiments, particularly, any 'preferred' embodiments, are merely possible examples of implementations, merely set forth for a clear understanding of the principles of the invention. Many variations and modifications may be made to the above-described preferred embodiment(s) without departing substantially from the spirit and principles of the invention. All such modifications and variations are intended to be included herein within the scope of this disclosure and the above-described preferred embodiment(s) and protected by the following claims.

What is claimed is:

1. A method for improving the Quality of Service (QoS) of access terminal interactive data, comprising:

setting attribute parameters of a reverse inter-user QoS level corresponding to an access terminal's QoS level for the access terminal; and adjusting a transmission rate of the access terminal based on the attribute parameters of the reverse inter-user QoS level, wherein setting the attribute parameters of the reverse inter-user QoS level corresponding to the access terminal's QoS level for the access terminal comprises:

setting an attribute parameter of a reverse maximum rate limit for the access terminal and setting an attribute parameter of a reverse transition probability matrix corresponding to the access terminal's QoS level for the access terminal, and wherein setting the attribute parameter of the reverse transition probability matrix corresponding to the access terminal's QoS level for the access terminal comprises:

setting, a high attribute parameter of a transition probability matrix for an access terminal of high QoS level, and setting a low attribute parameter of a transition probability matrix for an access terminal of low QoS level wherein adjusting the transmission rate of the access terminal based on the attribute parameters of the reverse inter-user QoS level comprises:

obtaining the attribute parameter of the reverse inter-user QoS level corresponding to the QoS level subscribed by the access terminal; and adjusting the transmission rate of an access terminal of each QoS level based on the attribute parameter of the reverse inter-user QoS level corresponding to the QoS level subscribed by the access terminal.

2. The method of claim 1, wherein obtaining the attribute parameter of the reverse inter-user QoS level corresponding to the QoS level subscribed by the access terminal comprises:

querying, by the access network, the QoS level subscribed by the access terminal in account information of the access terminal according to identity information of the access terminal, and obtaining the corresponding attribute parameters of the reverse transition probability matrix and/or maximum rate limit according to the QoS level, wherein the identity information of the access terminal is carried by a connection request message when the access terminal accesses the system.

3. The method of claim 1, wherein adjusting the transmission rate of an access terminal of each QoS level based on the attribute parameter of the reverse inter-user QoS level corresponding to the QoS level subscribed by the access terminal comprises:

notifying, by the access network, the access terminal to update the transition probability matrix by negotiating an attribute parameter of rate, and updating the reverse maximum rate limit of the access terminal using the attribute parameter of maximum rate limit set for the access terminal by transmitting a reverse rate limit message; and determining whether the reverse traffic channel is overloaded according to total noise received on the reverse direction:

if Yes, transmitting a Reverse Activity Bit characterized as overloaded to the access terminal, and then receiving, by the access terminal, the Reverse Activity Bit, and adjusting the transmission rate of the reverse channel according to the characteristic of the Reverse Activity Bit and updated attribute parameters of transition probability matrix and/or maximum rate limit;

otherwise, transmitting a Reverse Activity Bit characterized as not overloaded to the user access terminal, and then receiving, by the user access terminal, the Reverse Activity Bit, and adjusting the transmission rate of the reverse channel according to the characteristic of the Reverse Activity Bit and the updated attribute parameters of transition probability matrix and/or maximum rate limit.

4. A method for improving the Quality of Service (QoS) of access terminal interactive data, comprising:

obtaining, by an access terminal, attribute parameters of a reverse inter-user QoS level corresponding to the QoS level subscribed by the access terminal from an access network when the access terminal accesses the system by a connection request message; and adjusting, by the access terminal, a transmission rate of a reverse traffic channel according to the attribute parameters of the reverse inter-user QoS level based on the information regarding whether the reverse traffic channel is overloaded wherein the attribute parameters of the reverse inter-user QoS level comprises attribute parameters of a transition probability matrix and a maximum rate limit, wherein the access terminal adjusting the transmission rate of the reverse traffic channel according to the attribute parameters of the reverse inter-user QoS level comprises: receiving, by the access terminal, a Reverse Activity Bit, and adjusting the reverse transmission rate according to the characteristic of the Reverse Activity Bit and updated attribute parameters of the transition probability matrix and/or the maximum rate limit, and wherein the Reverse Activity Bit is characterized as overloaded if the reverse traffic channel is overloaded according to total noise received on the reverse direction and the Reverse Activity Bit is characterized as not overloaded if the reverse traffic channel is not overloaded according to total noise received on the reverse direction;

wherein the transition probability matrix is updated by negotiating an attribute parameter of rate with the access network.

5. The method of claim 4, wherein obtaining, by an access terminal, attribute parameters of the reverse inter-user QoS level corresponding to the QoS level subscribed by the access terminal from the access network when the user access terminal accesses the system by a connection request message comprises:

accessing, by the access terminal, the system by the connection request message which carries an identity information of the access terminal; and updating, by the access terminal, the reverse maximum rate limit of the access terminal using the attribute parameter of maximum rate limit set for the access terminal by receiving a reverse rate limit message.

6. A system for improving the Quality of Service (QoS) of access terminal interactive data, comprising: an access terminal and an access network, wherein, the access network is configured to set attribute parameters of a reverse inter-user QoS level corresponding to a QoS level subscribed by the access terminal, and the access terminal is configured to access the system by a connection request message, obtain the attribute parameters of the reverse inter-user QoS level from the access network, and adjust a transmission rate of a reverse channel according to the attribute parameters of the reverse inter-user QoS level based on the information regarding whether a reverse load is overloaded obtained from the access network, wherein the attribute parameters of the reverse inter-user QoS level comprises attribute parameters of a transition probability matrix and a maximum rate limit, wherein the access terminal adjusting the transmission rate of the reverse channel according to the attribute parameters of the reverse inter-user QoS level comprises:

receiving, by the access terminal, a Reverse Activity Bit, and adjusting the reverse transmission rate according to the characteristic of the Reverse Activity Bit and updated attribute parameters of the transition probability matrix and/or the maximum rate limit, and wherein the Reverse Activity Bit is characterized as overloaded if the reverse traffic channel is overloaded according to total noise received on the reverse direction and the Reverse Activity Bit is characterized as not overloaded if the reverse traffic channel is not overloaded according to total noise received on the reverse direction.

7. A device for improving the Quality of Service (QoS) of access terminal interactive data, comprising:

a configuration unit, configured to set attribute parameters of a reverse inter-user QoS level corresponding to an access terminal's QoS level for the access terminal; and an adjusting unit, configured to adjust a transmission rate of the access terminal based on the attribute parameters of the reverse inter-user QoS level, wherein the configuration unit sets the attribute parameters of the reverse inter-user QoS level corresponding to the access terminal's QoS level for the access terminal through the following processes:

setting an attribute parameter of a reverse maximum rate limit for the access terminal, and setting an attribute parameter of a reverse transition probability matrix corresponding to the access terminal's QoS level for the access terminal, and wherein setting the attribute parameter of the reverse transition probability matrix corresponding to the access terminal's QoS level for the access terminal comprises setting a high attribute parameter of a transition probability matrix for an access terminal of high QoS level, and setting a low attribute parameter of a transition probability matrix for an access terminal of low QoS level;

wherein, the adjusting unit adjusts the transmission rate of the access terminal based on the attribute parameters of the reverse inter-user QoS level through the following processes:

obtaining the attribute parameter of the reverse inter-user QoS level corresponding to the QoS level subscribed by the access terminal and;

adjusting the transmission rate of an access terminal of each QoS level based on the attribute parameter of the reverse inter-user QoS level corresponding to the QoS level subscribed by the access terminal.

8. The device of claim 7, wherein, the adjusting unit obtains the attribute parameter of the reverse inter-user QoS level corresponding to the QoS level subscribed by the access terminal through the following processes:

querying the QoS level subscribed by the access terminal in account information of the access terminal according to the identity information, and obtaining the corresponding attribute parameters of the reverse transition probability matrix and/or the maximum rate limit according to the QoS level, wherein the identity information of the access terminal is carried by a connection request message when the access terminal accesses the system.

9. A terminal for improving the Quality of Service (QoS) of access terminal interactive data, comprising:

an obtaining unit, configured to obtain attribute parameters of a reverse inter-user QoS level corresponding to a QoS level subscribed by an access terminal from an Access Network; and an adjusting unit, configured to adjust a transmission rate of a reverse channel according to the attribute parameters of the reverse inter-user QoS level based on information regarding whether a reverse load is overloaded, wherein the attribute parameters of the reverse inter-user QoS level comprises attribute parameters of a transition probability matrix and a maximum rate limit, wherein the adjusting unit adjusting the transmission rate of the reverse channel according to the attribute parameters of the reverse inter-user QoS level comprises receiving a Reverse Activity Bit, and adjusting the reverse transmission rate according to the characteristic of the Reverse Activity Bit and updated attribute parameters of the transition probability matrix and/or the maximum rate limit, and wherein the Reverse Activity Bit is characterized as overloaded if the reverse traffic channel is overloaded according to total noise received on the reverse direction and the Reverse Activity Bit is characterized as not overloaded if the reverse traffic channel is not overloaded according to total noise received on the reverse direction;

wherein the transition probability matrix is updated by negotiating an attribute parameter of rate with the access network.

10. A method for improving the Quality of Service (QoS) of access terminal interactive data, comprising:

setting attribute parameters of a reverse inter-user QoS level corresponding to an access terminal's QoS level for the access terminal; and adjusting a transmission rate of the access terminal based on the attribute parameters of the reverse inter-user QoS level, wherein setting the attribute parameters of the reverse inter-user QoS level corresponding to the access terminal's QoS level for the access terminal comprises:

setting an attribute parameter of the reverse transition probability matrix for the access terminal, and setting an attribute parameter of the reverse maximum rate limit corresponding to the access terminal's QoS level for the access terminal, and wherein setting the attribute parameter of the reverse maximum rate limit corresponding to the access terminal's QoS level for the access terminal comprises: setting a high attribute parameter of a reverse maximum rate limit for an access terminal of high QoS level, and setting a low attribute parameter of a reverse maximum rate limit for an access terminal of low QoS level;

wherein adjusting the transmission rate of the access terminal based on the attribute parameters of the reverse inter-user QoS level comprises:

obtaining the attribute parameter of the reverse inter-user QoS level corresponding to the QoS level subscribed by the access terminal; and adjusting the transmission rate of an access terminal of each QoS level based on the attribute parameter of the reverse inter-user QoS level corresponding to the QoS level subscribed by the access terminal.

11. The method of claim 10, wherein obtaining the attribute parameter of the reverse inter-user QoS level corresponding to the QoS level subscribed by the access terminal comprises:

querying, by the access network, the QoS level subscribed by the access terminal in account information of the access terminal according to identity information of the access terminal, and obtaining the corresponding attribute parameters of the reverse transition probability matrix and/or maximum rate limit according to the QoS level, wherein the identity information of the access terminal is carried by a connection request message if the access terminal accesses the system.

12. The method of claim 10, wherein adjusting the transmission rate of an access terminal of each QoS level based on the attribute parameter of the reverse inter-user QoS level corresponding to the QoS level subscribed by the access terminal comprises:

notifying, by the access network, the access terminal to update the transition probability matrix by negotiating an attribute parameter of rate, and updating the reverse maximum rate limit of the access terminal using the attribute parameter of maximum rate limit set for the access terminal by transmitting a reverse rate limit message; and determining whether the reverse traffic channel is overloaded according to total noise received on the reverse direction:

if Yes, transmitting a Reverse Activity Bit characterized as overloaded to the access terminal, and then receiving, by the access terminal, the Reverse Activity Bit, and adjusting the transmission rate of the reverse channel according to the characteristic of the Reverse Activity Bit and updated attribute parameters of transition probability matrix and/or maximum rate limit;

otherwise, transmitting a Reverse Activity Bit characterized as not overloaded to the user access terminal, and receiving, by the user access terminal, the Reverse Activity Bit, and adjusting the transmission rate of the reverse channel according to the characteristic of the Reverse Activity Bit and the updated attribute parameters of transition probability matrix and/or maximum rate limit.

13. A device for improving the Quality of Service (QoS) of access terminal interactive data, comprising:

a configuration unit, configured to set attribute parameters of a reverse inter-user QoS level corresponding to an access terminal's QoS level for the access terminal; and an adjusting unit, configured to adjust a transmission rate of the access terminal based on the attribute parameters of the reverse inter-user QoS level, wherein the configuration unit sets the attribute parameters of the reverse inter-user QoS level corresponding to the access terminal's QoS level for the access terminal through the following processes:

setting an attribute parameter of a reverse transition probability matrix for the access terminal, and setting an attribute parameter of a reverse maximum rate limit corresponding to the access terminal's QoS level for the access terminal, and wherein setting the attribute parameter of the reverse maximum rate limit corresponding to the access terminal's QoS level for the access terminal comprises:

setting a high attribute parameter of a reverse maximum rate limit for an access terminal of high QoS level, and setting a low attribute parameter of a reverse maximum rate limit for an access terminal of low QoS level;

wherein, the adjusting unit adjusts the transmission rate of the access terminal based on the attribute parameters of the reverse inter-user QoS level through the following processes:

obtaining the attribute parameter of the reverse inter-user QoS level corresponding to the QoS level subscribed by the access terminal and;

adjusting the transmission rate of an access terminal of each QoS level based on the attribute parameter of the reverse inter-user QoS level corresponding to the QoS level subscribed by the access terminal.

* * * * *